J. D. SMITH.
Corn Planter
No. 59,283.
Patented Oct. 30, 1866.
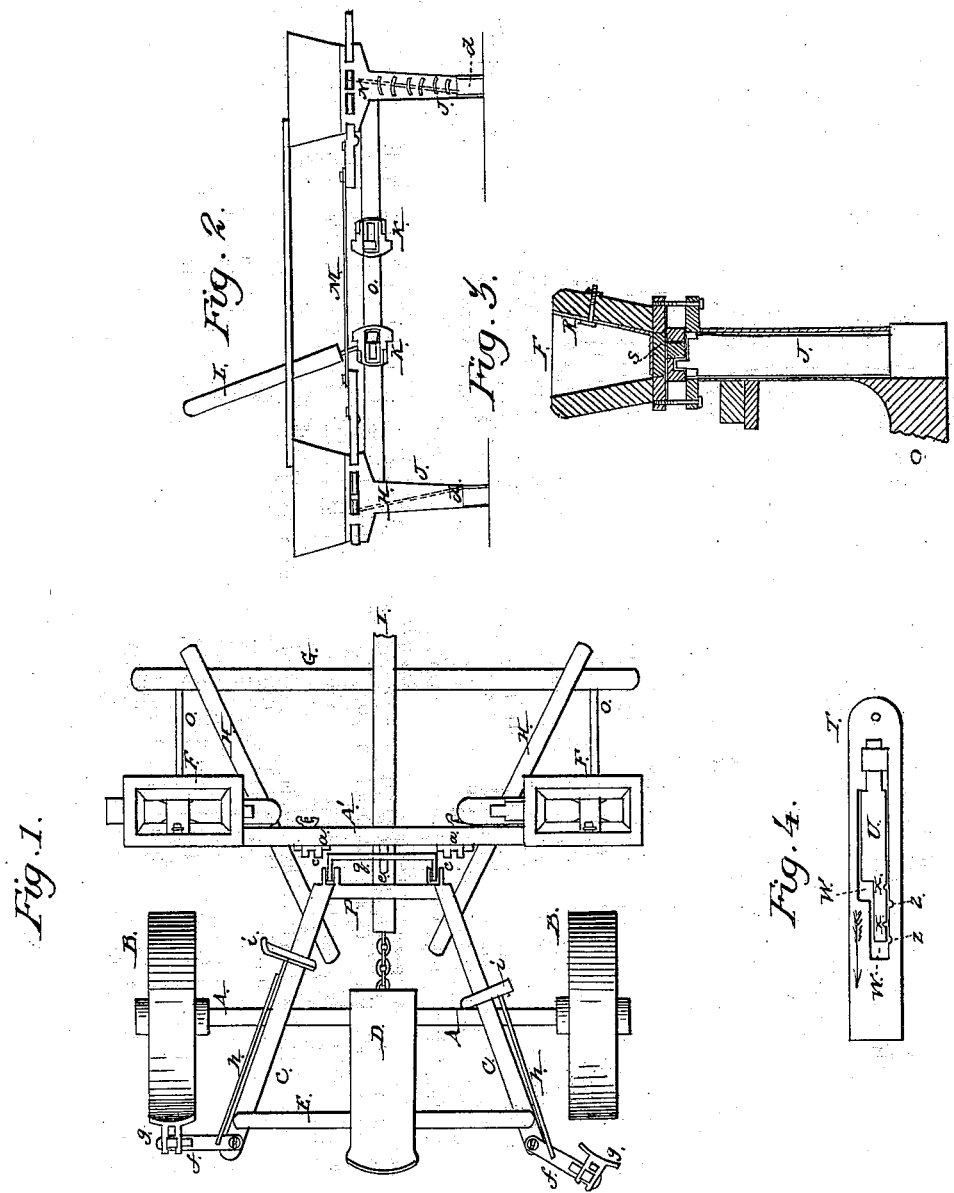
Witnesses:
Charles Alexander
John P. Jacobs
Inventor:
Joseph. D. Smith
per Alexander & Mason
Atty

UNITED STATES PATENT OFFICE.

JOSEPH D. SMITH, OF PEORIA, ILLINOIS.

IMPROVEMENT IN SEEDING-MACHINES.

Specification forming part of Letters Patent No. 59,283, dated October 30, 1866.

*To all whom it may concern:*

Be it known that I, JOSEPH D. SMITH, of Peoria, in the county of Peoria and State of Illinois, have invented certain new and useful Improvements in Seeding-Machines; and I do hereby declare that the following is a clear, exact, and full description of the same, reference being had to the accompanying drawings, and to the letters of reference marked thereon.

In the annexed drawings, making part of this specification, A represents the axle of the machine, which is provided at each end with wheels B B, which serve to carry the rear of the machine. This axle has lying upon and secured to it the hounds C C, which converge as represented. The rear of these hounds is connected by a bar, E, and their front is connected by a bar, P.

The seat D is erected on suitable standards upon the axle A and upon the bar E. A' represents a bar which supports the seed-boxes F F, and which is supported upon the runners by means of the heels J J, which rest upon said runners. These runners are made in the form of sleigh-runners, turning up at their forward ends, and thus serve to run over the inequalities of the ground, while they serve to open a furrow for the grain as it drops through the heels J from the seed-boxes F.

H H represent two hounds, which lie across or under the bar A', and which are connected at their forward ends by means of a bar, G. These hounds converge as they pass back, and their rear ends pass under the hounds C C on the axle A. The runners turn up and secure at their forward ends to the bar G.

I represents the tongue of the machine, which passes back and is connected to the support which sustains the forward part of the driver's seat by means of a hook or its equivalent, which is attached to said support. The heels J J are perforated or slotted on their rear sides (being cast in this form) so as to allow the driver to see a rod, d, which is erected in this heel, and attached at its upper end to the seed-slide, so that it may be seen when the said slide is operating. By having the heels slotted in this manner (not having them open entirely) the seed is prevented from dropping where it is not wanted—too far behind.

q represents a metallic rod or bar, made in the form shown, and hinged to the bar P, as herein represented, thus connecting the front and rear part of the machine in such a way that it will adjust itself to the inequalities of the ground. The bar A' is provided with a pin, e, which passes through a circular hole in the bar or rod q, and is secured there by means of a wedge, which passes through its end, forming a linchpin. This connection admits of another adjustment of the two parts of the machine to the inequalities of the ground. The first-described arrangement allows the machine to accommodate itself to inequalities of the ground which are at right angles to the machine, while the second-described arrangement allows it to accommodate itself to inequalities which lie upon either one side of the machine or the other, raising one wheel and not the other, or one runner and not the other. By means of these joints the machine runs smoothly over ground which is irregular and distributes the grain regularly over these irregular pieces of ground.

a a represent two small metallic slides, which are secured by means of screws or their equivalents, which pass through slots in these slides, to the rear side of the bar A'. These slides are provided with small lugs c c. The slides move longitudinally of the bar A' and embrace the ends of the bar q, and by means of its lugs c c prevent the said bar q from rising and falling at either end, and thus prevent one of the modes described of the machine adjusting itself to inequalities. By moving these slides the bar q is either made stationary or is allowed to move so as to allow of side adjustments.

g represents scrapers, which are secured at the backs of the wheels B B. The inner sides of these scrapers are concave to conform to the convexity of the wheels. They are also pointed at their lower ends, and are provided with a slotted arm at their upper sides. f represents a metallic piece, which is pivoted to one of the hounds C C at one end and which has a slot cut in it at its other end. A set-screw passes through the slot in the arm of the scraper and then through the slot in the piece f, and confines the two together, allowing, as seen, of two adjustments of the scraper, one to the face of the wheel and the other its distance from the wheel.

h represents a rod which runs and connects to a foot-piece, *i*. This foot-piece is operated by the foot of the driver in applying or removing the scraper to or from the wheel.

T represents the seed-slide, which is provided with another slide, U. The slide U is properly fitted and secured in and to the slide T. When the two slides stand in the position shown in Figure 4, the openings *w w* are formed, which are used for seeding corn or such large grain. When the slide U is shoved up in the direction of the arrow the corn-openings *w w* are closed and the openings *x x* stop opposite, and, in connection with the holes *z z* in slide T, form seed-openings for small grain. Immediately over the seed-openings in the slides, and at the bottom of the seed-hoppers F, is placed a piece of india-rubber, which acts as a cut-off.

R represents a metallic keeper, which is a metallic plate slotted in its upper end, with its lower end bent almost at a right angle. This lower end rests upon the rubber cut-off and keeps it in its place. The sides of this keeper fit between two lugs upon a metallic plate immediately over the seed-slide, and thus it is prevented from any side or lateral movement. This keeper is secured to the sides of the seed-box by means of a set-screw, which passes through the slot in its upper end. When the slides *a a* confine the bar or rod *q* so that it cannot move, the driver, by simply changing his position to the back of the seat, may bring the hounds C C down upon the rear ends of the hounds H H, and, thus preventing any adjustment, make a rigid machine. The slot in the keeper allows said keeper to be lowered and thus follow the rubber cut-off as it wears away, and thus adjust it to the seed-slide.

Having thus fully described my invention, what I claim as new, and desire to secure by Letters Patent, is—

1. The bar *q*, the pin *e*, or its equivalent, and the bars A' and P, constructed and used for forming an adjustment, as herein fully set forth.

2. The bar *q*, the pin *e*, and the slides *a a*, arranged and constructed as and for the purpose herein specified.

3. Combination of the slides T and U, constructed and arranged together as and for the purpose herein specified.

4. The combination of the scraper *g*, the slotted piece *f*, the rod *h*, and the foot-piece *i*, constructed and used as and for the purpose set forth.

5. So arranging the hounds H H with the hounds C C that when the driver changes his position to the rear of the seat the said hounds H H bear against the under side of the hounds C C, and thus make a rigid machine, as and for the purpose set forth.

J. D. SMITH.

Witnesses:
C. M. ALEXANDER,
J. M. MASON.